United States Patent
Wang et al.

(10) Patent No.: US 9,054,536 B2
(45) Date of Patent: Jun. 9, 2015

(54) SYSTEM AND METHOD FOR CHARGING AND DISCHARGING BATTERY

(75) Inventors: Hung-Yi Wang, New Taipei (TW); Hsiang-Pin Tseng, New Taipei (TW); Min-Wei Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 349 days.

(21) Appl. No.: 13/592,614

(22) Filed: Aug. 23, 2012

(65) Prior Publication Data

US 2013/0175865 A1    Jul. 11, 2013

(30) Foreign Application Priority Data

Jan. 6, 2012    (TW) .............................. 101100710 A

(51) Int. Cl.
    *H02J 7/00*    (2006.01)
(52) U.S. Cl.
    CPC ................. *H02J 7/0024* (2013.01); *H02J 7/00* (2013.01); *H02J 7/0019* (2013.01); *Y02E 60/12* (2013.01); *H02J 7/0013* (2013.01)
(58) Field of Classification Search
    CPC ....... Y02T 10/7005; Y02E 60/12; H02J 7/00; H02J 7/0013; H02J 7/0016; H02J 7/0019; H02J 7/0024

USPC ................................. 320/116–122, 127–128
See application file for complete search history.

(56) References Cited

U.S. PATENT DOCUMENTS

2013/0106357 A1 * 5/2013 Girard et al. .................. 320/126
2014/0084869 A1 * 3/2014 Ryu et al. ..................... 320/118

\* cited by examiner

*Primary Examiner* — Stacy Whitmore
(74) *Attorney, Agent, or Firm* — Novak Druce Connolly Bove + Quigg LLP

(57) ABSTRACT

A system for charging and discharging batteries includes a battery module, an adapter, a charger, and an electronic device electrically connected to the charger and the battery module. The battery module includes a first cell battery, a second cell battery, and a first switch electrically connected to the first and second battery cells. The adapter receives an AC voltage, and converts the AC voltage to a DC voltage. The charger receives the DC voltage, and charges the battery module accordingly. The electronic device is electrically connected to the charger and the battery module. When the charger charges the battery module, the first switch is switched to electrically connect the first and second battery cells with the charger in series. When the battery module discharges to the electronic device, the first switch is switched to electrically connect the first and second battery cells with the electronic device in parallel.

4 Claims, 3 Drawing Sheets

US 9,054,536 B2

SYSTEM AND METHOD FOR CHARGING AND DISCHARGING BATTERY

BACKGROUND

1. Technical Field

The present disclosure relates to a system and method for charging and discharging a battery.

2. Description of Related Art

Electronic devices such as mobile phones and notebooks require high quality storage batteries. A typical storage battery includes a plurality of battery cells electrically connected in series to provide power. An adapter converts an AC voltage to a DC voltage which is provided to the storage battery in a charging process. A power conduction loss on the storage battery is calculated by a ratio between a voltage input and a voltage output on the storage battery. However, the voltage input and the voltage output on the typical storage battery is a constant value in the charging and discharging process. Therefore, the power conduction loss on the storage battery is increased.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
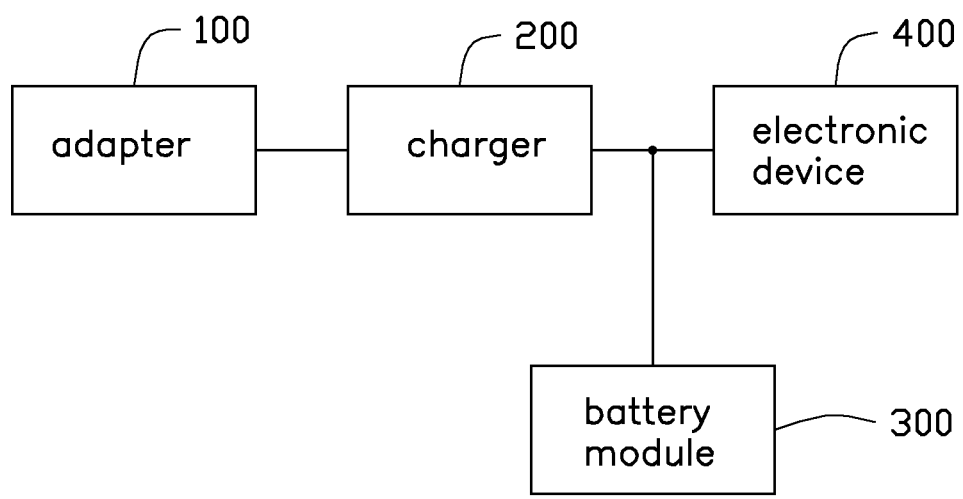
FIG. 1 is a block diagram of one embodiment of a system for charging and discharging a battery.

FIG. 1 illustrates a block diagram of a system for charging and discharging battery in accordance one embodiment. The system includes an adapter 100, a charger 200, a battery module 300, and an electronic device 400 electrically connected to the charger 200 and the battery module 300. The adapter 100 is adapted to receive an AC voltage, and convert the AC voltage to a DC voltage. The charger 200 is adapted to receive the DC voltage, and charge the battery module 300 accordingly.

Figure 2:
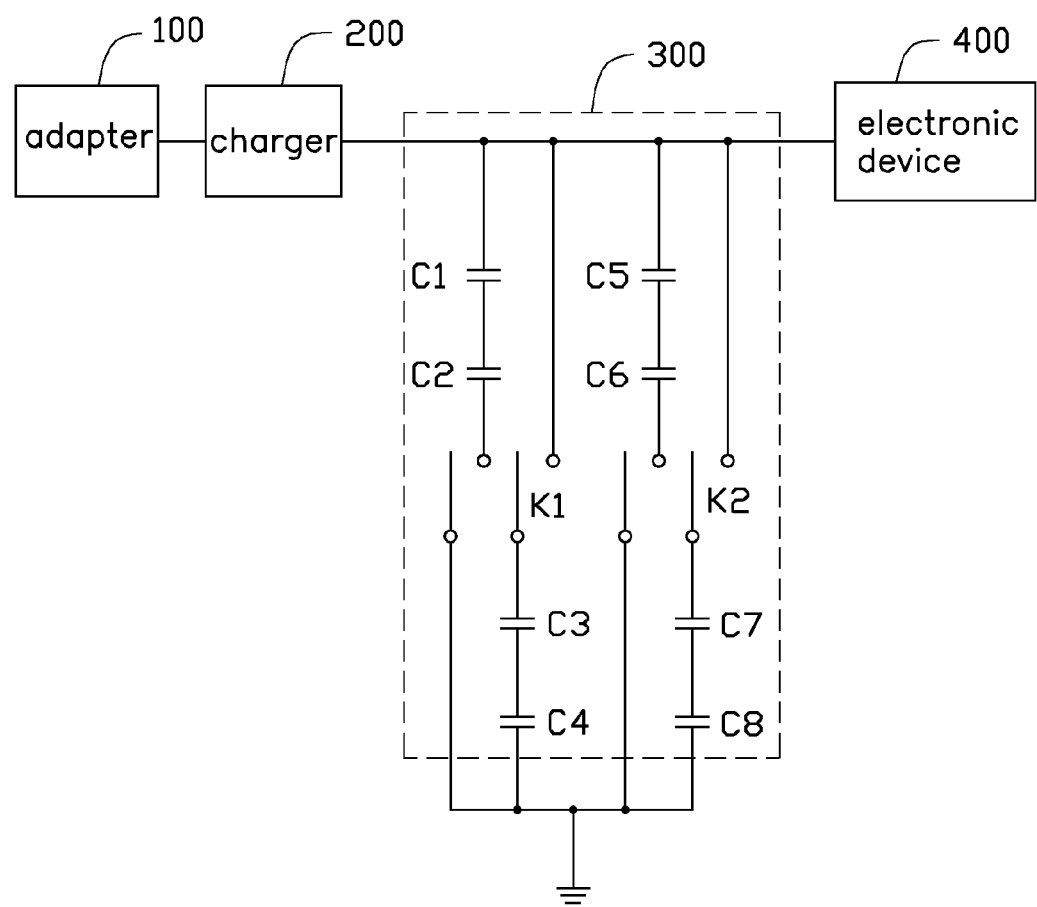
FIG. 2 is a circuit diagram of the system of FIG. 1.

FIG. 2 illustrates a circuit diagram of the system in accordance with one embodiment. The battery module 300 includes a plurality of battery cells C1-C8, a first switch K1 electrically connected to the battery cells C2, C3, and a second switch K2 electrically connected to the battery cells C6, C7. Each of the first and second switches K1, K2 includes a first terminal, a second terminal, a third terminal, and a fourth terminal. The second terminal of the first switch K1 is electrically connected to a connection point between the charger 200 and the electronic device 400 via the battery cells C1, C2 connected in series. The third terminal of the first switch K1 is electrically connected to the connection point between the charger 200 and the electronic device 400. The first terminal of the first switch K1 is grounded via the battery cells C3, C4 connected in series. The fourth terminal of the first switch K1 is grounded. The second terminal of the second switch K2 is electrically connected to the connection point between the charger 200 and the electronic device 400 via the battery cells C5, C6 connected in series. The third terminal of the second switch K2 is electrically connected to the connection point between the charger 200 and the electronic device 400. The first terminal of the second switch K2 is grounded via the battery cells C7, C8 connected in series. The fourth terminal of the second switch K2 is grounded. In one embodiment, the first switch K1 and the second switch K2 are double-pole double throw switches.

In a working state, when the charger 200 charges the battery module 300, the first switch K1 is switched to electrically connect the second terminal of the first switch K1 with the first terminal of the first switch K1. The battery cells C1-C4 are electrically connected with the charger 200 in series. The second switch K2 is switched to electrically connect the second terminal of the second switch K2 with the first terminal of the second switch K2. The battery cells C5-C8 are electrically connected with the charger 200 in series. A voltage on the battery module 300 is equal to a voltage on the battery cells C1-C4, and is equal to a voltage on the battery cells C5-C8. Therefore, a voltage difference between the adapter 100 and the battery module 300 is minimized. A power conduction loss on the battery module 300 is largely decreased.

When the battery module 300 discharges to the electronic device 400, the first switch K1 is switched to electrically connect the third terminal of the first switch K1 with the first terminal of the first switch K1, and electrically connect the second terminal of the first switch K1 with the fourth terminal of the first switch K1. The battery cells C1, C2 are electrically connected with the electronic device 400 in series. The battery cells C3, C4 are electrically connected with the electronic device 400 in series. The second switch K2 is switched to electrically connect the third terminal of the second switch K2 with the first terminal of the second switch K2, and electrically connect the second terminal of the second switch K2 with the fourth terminal of the second switch K2. The battery cells C5, C6 are electrically connected with the electronic device 400 in series. The battery cells C7, C8 are electrically connected with the electronic device 400 in series. A voltage on the battery module 300 is equal to a voltage on the battery cells C1, C2, and is equal to a voltage on the battery cells C3, C4. The voltage on the battery module 300 is equal to a voltage on the battery cells C5, C6, and is equal to a voltage on the battery cells C7, C8. Therefore, a voltage difference between the battery module 300 and the electronic device 400 is minimized. A power conduction loss on the battery module 300 is largely decreased.

Figure 3:
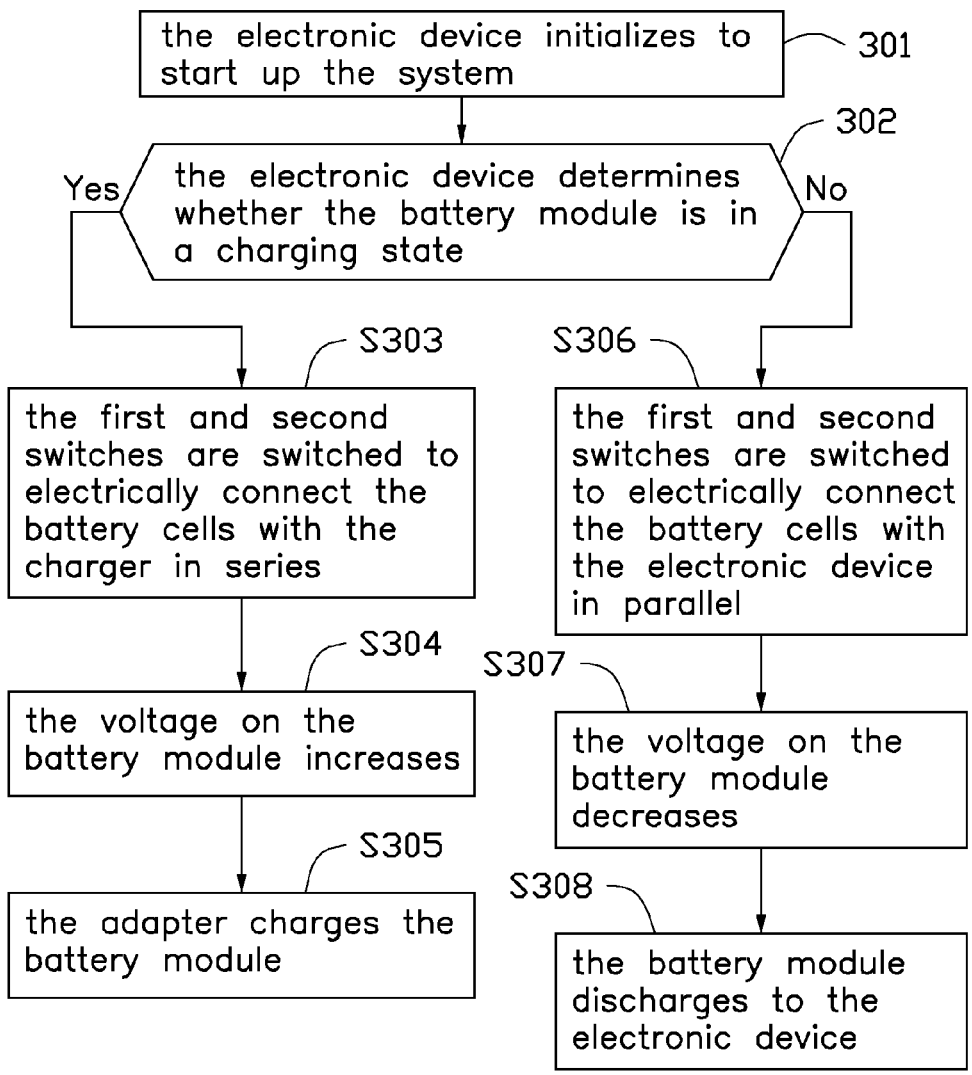
FIG. 3 is a flow chart of one embodiment of a method for charging and discharging the battery.

FIG. 3, illustrates a flow chart of a method for charging and discharging battery in accordance with one embodiment. Depending on the embodiment, certain steps described below may be removed, while others may be added, and the sequence of the steps may be altered. In one embodiment, the method for exposing photograph into separated parts in a camera device utilizing the above-described system includes the following steps:

S301: the electronic device 400 initializes to start up the system;

S302: the electronic device 400 determines whether the battery module 300 is in a charging state; if the battery module 300 is in a charging state, the method continues to step S303; if the battery module 300 is not in a charging state, the method continues to step S306;

S303: the first switch K1 is switched to electrically connect the battery cells C1-C4 with the charger 200 in series; the second switch K2 is switched to electrically connect the battery cells C5-C8 with the charger 200 in series;

S304: the voltage on the battery module 300 increases;

S305: the adapter 200 charges the battery module 300;

S306: the first switch K1 is switched to electrically connect the battery cells C1, C2 with the electronic device 400 in series, and electrically connect the battery cells C3, C4 with the electronic device 400 in series; the second switch K2 is switched to electrically connect the battery cells C5, C6 with the electronic device 400 in series, and electrically connect the battery cells C7, C8 with the electronic device 400 in series;

S307: the voltage on the battery module 300 decreases; and

S308: the battery module 300 discharges to the electronic device 400.

Even though numerous characteristics and advantages of the present disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A system for charging and discharging battery comprising:
    a battery module comprising a first cell battery, a second cell battery, and a first switch electrically connected to the first and second battery cells;
    an adapter adapted to receive an AC voltage and convert the AC voltage to a DC voltage;
    a charger adapted to receive the DC voltage and charge the battery module; and
    an electronic device electrically connected to the charger and the battery module; wherein when the charger charges the battery module, the first switch is switched to electrically connect the first and second battery cells with the charger in series; and when the battery module discharges to the electronic device, the first switch is switched to electrically connect the first and second battery cells with the electronic device in parallel,
    wherein the first switch comprises a first terminal, a second terminal, a third terminal, and a fourth terminal; the first terminal of the first switch is grounded via the second cell battery; the second terminal of the first switch is electrically connected to a connection point between the charger and the electronic device via the first cell battery; the third terminal of the first switch is electrically connected to the connection point between the charger and the electronic device; and the fourth terminal of the first switch is grounded.

2. The system of claim 1, wherein the battery module further comprises a third cell battery and a fourth cell battery; the third cell battery is electrically connected between the first cell battery and the first switch; the fourth cell battery is electrically connected between the second cell battery and ground.

3. The system of claim 2, wherein the battery module further comprises a fifth cell battery, a sixth cell battery, and a second switch; the second switch comprises a first terminal, a second terminal, a third terminal, and a fourth terminal; the first terminal of the second switch is grounded via the sixth cell battery; the second terminal of the second switch is electrically connected to the connection point between the charger and the electronic device via the fifth cell battery; the third terminal of the second switch is electrically connected to the connection point between the charger and the electronic device; and the fourth terminal of the second switch is grounded.

4. The system of claim 3, wherein the battery module further comprises a seventh cell battery and an eighth cell battery; the seventh cell battery is electrically connected between the fifth cell battery and the second switch; the eighth cell battery is electrically connected between the sixth cell battery and ground.

* * * * *